United States Patent Office 2,925,319
Patented Feb. 16, 1960

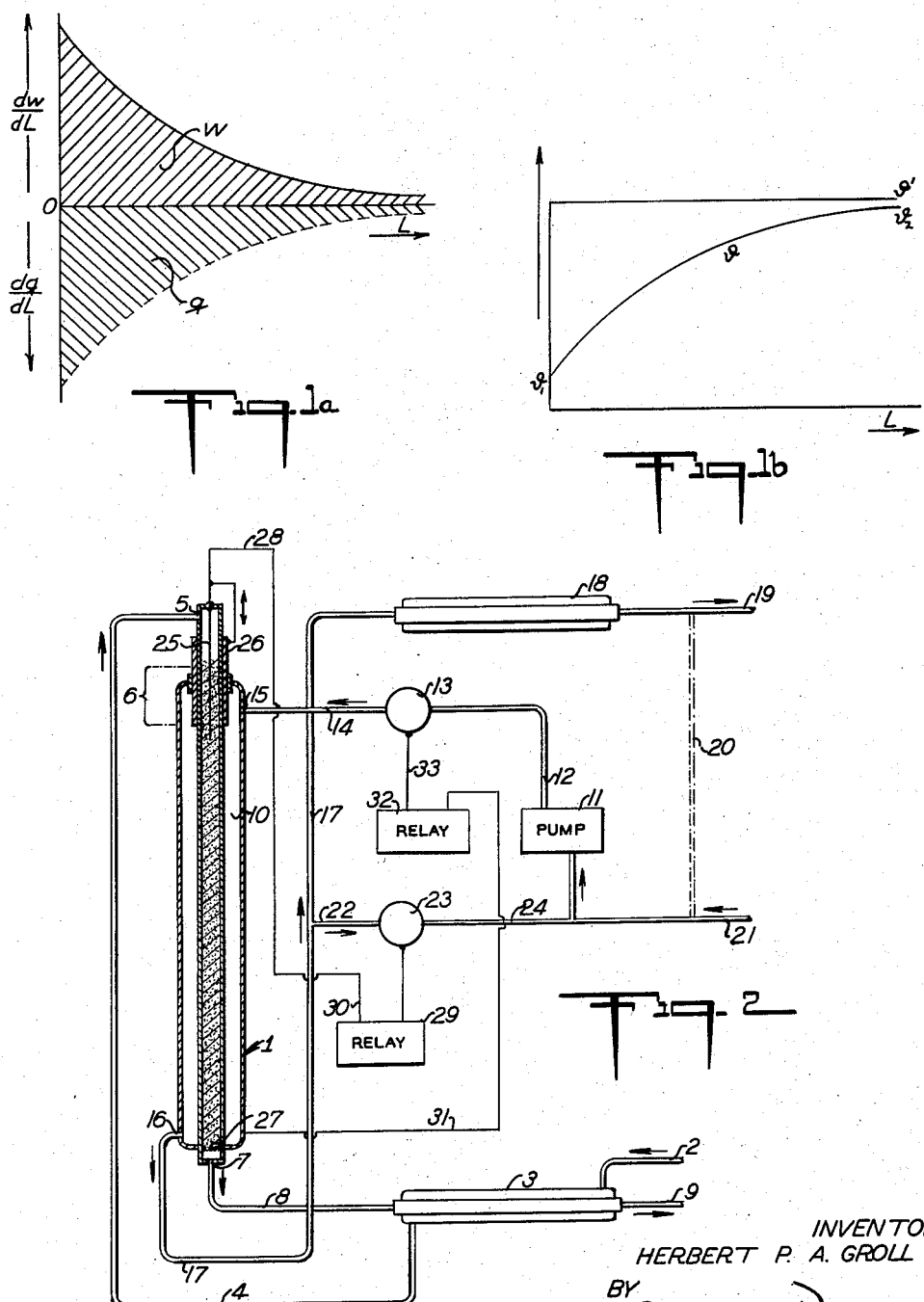

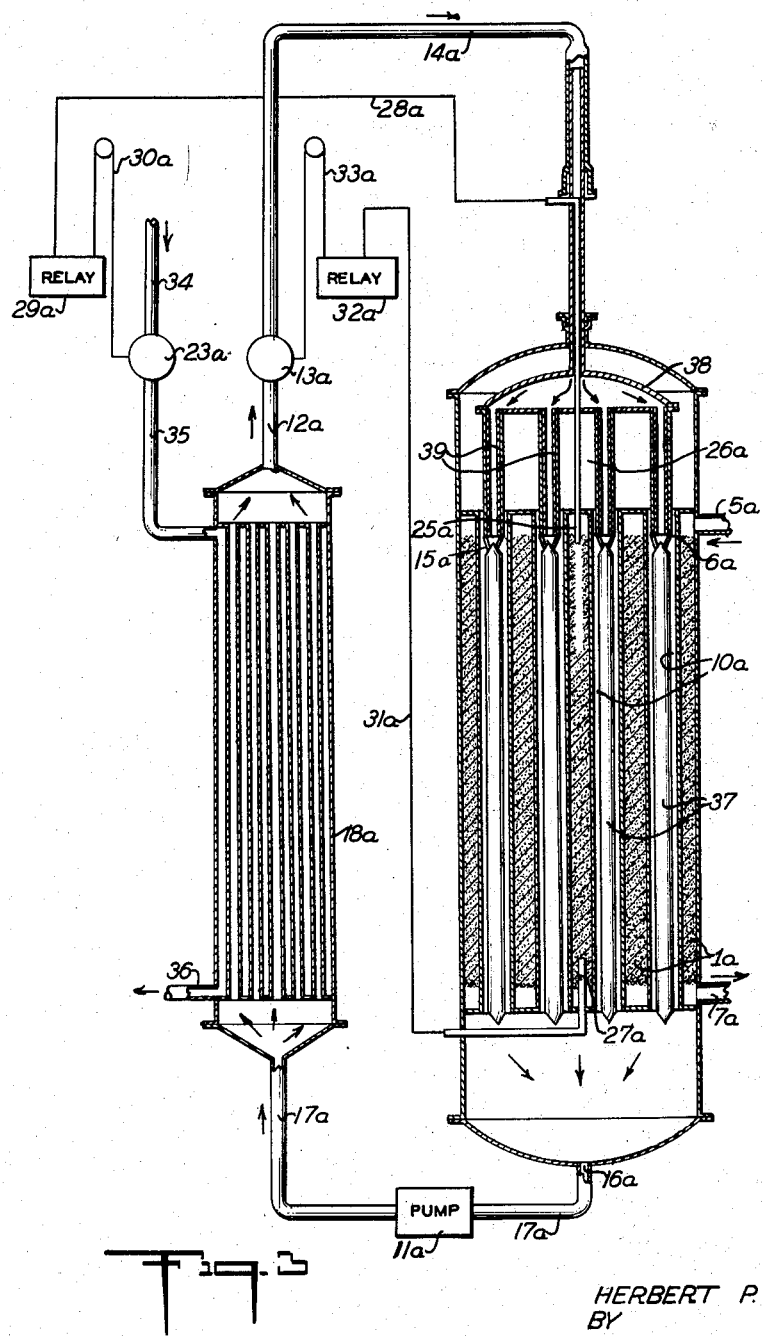

2,925,319

PROCESS AND APPARATUS FOR COOLING EXOTHERMIC REACTIONS

Herbert P. A. Groll, Molndal, Sweden

Application January 20, 1954, Serial No. 405,191

Claims priority, application Sweden January 21, 1953

14 Claims. (Cl. 23—1)

This invention relates to improvements in the cooling of exothermic reactions.

The invention more particularly relates to the temperature control of exothermic chemical reactions by effectively removing the heat of reaction by transfer from the reaction mixture to a suitable heating or cooling medium.

One object of the invention is to maintain the temperature within the reaction zone of an exothermic chemical reaction over its entire length constant to a degree that heretofore had been considered impossible. This, and still further objects, will become apparent from the following description read in conjunction with the drawings, in which:

Fig. 1a is a curve showing the heat generated in a typical catalytic exothermic reaction over the length of the reaction zone as a function of the reaction zone length, and the heat removed from the reaction zone over the length as a function of the length in order to maintain isothermic conditions;

Fig. 1b is a graph showing the course of the temperature of a cooling medium passing through the reaction zone in which the reaction temperature is maintained isothermic;

Fig. 2 is a diagrammatic representation of an embodiment of an apparatus for effecting an exothermic reaction with cooling in accordance with the invention; and Fig. 3 shows a different embodiment of an apparatus in accordance with the invention.

My method of carrying out a reaction under controlled temperature conditions is particularly useful if applied to catalytic reactions. Most catalysts demand a limited temperature range for successful operation. If the temperature is too low the reaction rate becomes insufficient; if it is too high, the catalyst is damaged or destroyed, or undesirable side-reactions occur. It is, however, not always necessary or desirable to operate under such conditions that the temperature in the reaction zone is constant over the whole length of this zone. A certain limited temperature gradient may in some cases be desirable. For example, in certain cases it may be advisable to apply a relatively low reaction temperature for the initial stages in the reactor in order to prevent overheating and consequent deterioration of the catalyst and to raise the temperature at the end of the reaction zone, so that the last traces are converted at a sufficiently high reaction rate, although the concentration of the substances to be reacted becomes quite low. On the other hand, in other cases it may be desirable to carry out the bulk of the reaction at a comparatively high temperature and to lower the temperature towards the end of the reaction passage, so that a more complete conversion can take place.

In order to maintain essentially isothermic reaction conditions, it is always necessary that the entire heat of reaction be transferred out of the reaction space, i.e. through the walls of the reaction vessel. It is to be understood that the term "walls of the reactor," as used herein, includes not only the outside walls of the apparatus, but also all of the cooling walls which may be arranged inside of the reactor, as, for example, cooling tubes inserted into the reactor proper, or the walls of the catalyst tubes which are surrounded by the cooling medium. If the heat of reaction per unit of operating time is termed "W," and the heat transferred per unit operating time is termed "q," we have as a first condition for an isothermic reaction course the equation:

(1) $$W = -q$$

This condition, however, while guaranteeing a sufficient amount of cooling does not state anything about the rate at which the heat is transferred at any given spot along the entire length (L) of the reactor. If we assume that the reactor has the shape of tubes or channels through which the reagents are passed and the heating or cooling medium is outside the tube walls, the contact time ($t$) becomes a simple function of L, and we find as the other condition for an isothermic reaction course the equation:

(2) $$\frac{dW}{dL} = -\frac{dq}{dL}$$

(I wish to emphasize that a tubular form of the reactor is not at all necessary for carrying out my invention in practice. Other reactor shapes may be used equally successfuly.)

While condition (1) only assumes that the temperature at the end of the reaction zone is the same as that at its beginning, it does not take into consideration great local deviations from the desired temperature during the passage of the reagents through the tube. Condition (2), if adhered to, prevents any such deviations, and should, if it can be fulfilled, provide ideal reaction conditions.

It is well known that endothermic reactions are much easier to control than exothermic ones. The former show the great advantage that they tend to stabilize any upset temperature conditions automatically. This is due to the fact that the rate of reaction, rising and falling with the temperature, automatically and effectively adjusts the rate of heat consumption to the rate of heat supply. In contrast to this, an exothermic reaction must be held at an unstable thermal equilibrium by rigid outside control. With inadequate cooling, the temperature, the reaction rate, and the rate of heat formation rise so that the temperature is driven up in a vicious circle, which causes the reaction to "go wild." The opposite happens when the rate of cooling is too rapid, so that the reaction "dies."

From the viewpoint of difficulty of control, exothermic reactions may be classified in several classes:

*Class I.*—Those reactions which hardly need any temperature control, because they occur with good yields at such high temperatures, within such a wide temperature range, and on a heat stable catalyst that no external cooling is necessary at the reaction zone. The combustion of ammonia to nitric oxide is a typical example for this class. The upper allowable temperature limit is in this case controlled by the proportion between ammonia and air, and by the temperature to which the air is preheated.

*Class II.*—Those reactions which, owing to their nature and to the nature of the catalyst available, must be carried out within a temperature range at which the chemical equilibrium does not allow a complete reaction to occur, so that a great part of the reagents leave the reactor unchanged and must be recirculated. Thus, if the reaction temperature rises, owing to incomplete heat removal, the equilibrium becomes still more unfavorable, thus preventing further reaction, unless a lower temperature is restored by adequate cooling. This is a very convenient self-regulating effect which facilitates operation tremendously with this reaction type, and does not allow the reaction to go wild. Ammonia synthesis is a typical example of this class in which the recirculation mentioned above is applied. Another example is the water gas reaction for the conversion of carbon monoxide to carbon dioxide and hydrogen. In this case the gas leaving the converter should contain as little as possible unconverted carbon monoxide. Therefore a plurality of catalyst layers are used, the gas being cooled between layers. The yields per pass and the capacity of a given apparatus does, in any case, depend entirely upon the efficiency of heat removal.

*Class III.*—These are reactions which occur on particularly temperature-sensitive catalysts and/or which are inclined to change over to undesirable side-reactions. This class is very frequent in organic chemistry and includes a wide variety of reactions. Typical examples in the order of increasing difficulty of control are: hydrogenations, the oxo-process, methanol and isobutanol synthesis, partial hydrogenations, selective oxidations, the Fischer-Tropsch process, oxidation of naphthaline to phthalic anhydride and of ethylene to ethylene oxide. The last three are generally considered so difficult to control that only special measures such as thermostatic agitated salt baths, liquid evaporator systems, internal cooling, or operation under great dilution with recycle-gas are deemed adequate.

My invention can be carried into practice with great advantage for all reactions of classes 2 and 3, while it can be considered unnecessary for class 1. My invention is based upon the perception that it is possible to adjust the rate of cooling in suitably designed apparatus, so that it follows perfectly the conditions set out by Equations 1 and 2 without having to resort to extraordinary and expensive thermostatic evaporating baths or the like. As a matter of fact, thermostatic evaporating baths are not as effective as they generally are considered. Keeping the bath temperature constant throughout the bulk of the liquid does not prevent the temperature in the reaction passage proper from rising considerably above the temperature of the cooling liquid, especially at such points where the reaction occurs at its highest rate.

The rate of reaction depends upon the concentration of the reagents in the reaction zone, the rate constant $k$, which generally is a function of the temperature, the order of the reaction, and the catalyst activity. The order of the reaction concerned depends upon its mechanism, which in many cases is not fully understood, especially if the reaction occurs upon a solid catalyst. The rate can, however, be determined by measurements, and the order of reaction can thus be ascertained. Experience shows that most catalytic reactions are of first or second order. As the mechanism may be complicated and the rate may be determined by more than one elementary process occurring simultaneously, so-called mixed orders, such as between zero and first, or between first and second order, may result. On the basis of these determined and/or calculated values, the rate of conversion at any desired moment of the contact time can be calculated, and a satisfactory function derived for the rate of heat formation in any section of the reactor. In other words, the values for $$\frac{dW}{dL}$$

can be expressed as a function of L by an equation or by a curve.

This function is for any reaction of the type:

(3) $\quad \dfrac{dW}{dL} = \dfrac{Q}{v} F(c_a, c_b, \ldots)$ in which $Q$ = molar heat of reaction
$v$ = linear velocity
$c_a, c_b$, etc. = concentration of reagents at any point in the reactor. (These are functions of L), and
$a, b$, etc. = initial concentrations of reagents $F(\ldots), f(\ldots), \varphi(\ldots)$ express functions in the conventional manner. The function $F(c_a, c_b, \ldots)$ is generally of a type in which the term $$e^{-f(L)}$$

is of decisive importance, while the linear velocity $v$ itself may be a function of L if the reaction is accompanied by an expansion of contraction:

$$v = \varphi(L)$$

In the first approximation, $v$ can be regarded as constant and in many cases, where the practical concentrations are sufficiently far apart from the equilibrium concentrations at the reaction temperature applied, the necessary equations can easily be derived from the well known rate equations. For instance, the equation for a first order reaction is:

(4) $\quad \dfrac{dW}{dL} = \dfrac{Q}{v} k_1 a e^{-k_1 \frac{L}{v}}$ in which $k_1$ = velocity constant for the first order reaction under the reaction conditions chosen.

For an ideal second order reaction, the equation becomes somewhat more involved:

(5) $\quad \dfrac{dW}{dL} = \dfrac{Q k_2 \frac{a}{b}(b-a)^2 e^{k_2 \frac{L}{v}(a-b)}}{v\left(1 - \dfrac{a}{b} e^{k_2 \frac{L}{v}(a-b)}\right)^2}$ In practice, empirical equations often must be resorted to because the conditions become too involved for theoretical deduction. The type of the equation is, however, always that of Equation 3 with $e^{-f(L)}$ as decisive term.

The typical shape of a curve representing this type of equation is seen in Fig. 1a, which shows the value of $$\frac{dW}{dL}$$

as a function of L. In the same figure another function $$\frac{dq}{dL}$$

is drawn, which represents the amount of heat removed from the reactor at any point of its length. Completely isothermic conditions are obtained if the values of $$\frac{dq}{dL}$$

and $$\frac{dW}{dL}$$

assume equal absolute magnitude, with, however, opposite sign (Equation 2). In this case, which is shown in Fig. 1a, the two curves are exactly symmetrical to each other with the abscissa as the axis of symmetry.

I have now found that the cooling method which lends itself best to a perfect adaptation to the rate required by the reaction rate function consists of cooling with a cooling medium which flows concurrently with and parallel to the flow of the reacting mixture. The rate equations for the heat taken up by a flowing cooling medium from an isothermic heat source per unit of operating time are:

(6) $\quad q = Cn(\vartheta_1 - \vartheta_2)$ (7) $\quad \dfrac{dq}{dL} = K(\vartheta' - \vartheta_1) e^{\dfrac{-K D \pi L}{n.c}}$ in which:

$K$ = heat transfer constant in a given apparatus design $q$=heat taken up per unit of operating time
$L$=tube length
$D$=tube diameter
$C$=mean value of the molecular heat capacity of the cooling medium
$\vartheta'$=reaction temperature
$\vartheta$=temperature of the cooling medium
$\vartheta_1$=temperature of the cooling medium entering the apparatus
$\vartheta_2$=temperature of the cooling medium leaving the apparatus
$n$=number of moles of cooling medium per unit of operating time The heat of radiation has not been considered in the above equation. In cases in which radiation becomes so high that it cannot be neglected, the function becomes more complicated without changing its general character.

The values for $q$ and $$\frac{dq}{dL}$$

should according to Equations 1 and 2 be equal to the negative values of W and $$\frac{dW}{dL}$$

if perfect temperature control is to be achieved.
The complete equations read as follows:

(8) $\quad -Cn(\vartheta_1-\vartheta_2)=W$ (9) $\quad K(\vartheta'-\vartheta_1)e^{-\frac{KD\pi L}{nC}} = -\dfrac{Qk_2\frac{a}{b}(b-a)^2 e^{k_2\frac{L}{v}(a-b)}}{v\left(1-\frac{a}{b}e^{k_2\frac{L}{v}(a-b)}\right)^2}$ In Equations 9, both sides are the $e$-function type. It is obvious that the value of the right side of the equation is determined by the nature of the reaction and of the catalyst ($Q$ and $k_2$), the concentration of the reagents ($a$ and $b$), the gas velocity ($v$), and the dimension of the apparatus ($L$). The value of the left side, on the other hand, is determined by parameters which are a matter of apparatus design ($D$, $L$ and $K$) and of the nature of the cooling medium ($C$ and $k$). The designer of the apparatus should obviously choose these parameters within suitable limits with consideration of the nature and velocity of the reaction (represented chiefly by the right side of the equation), so that it is possible for both sides of the equation to be equal to each other. Under this prerequisite of design, which makes the application of my invention possible, without, however, being part of the invention, the balance of the Equations 8 and 9 under operating conditions can at any time under the operation be changed by controlling only the parameters $n$ and $\vartheta_1$. These control parameters, however, represent the flow velocity of the cooling medium and its temperature at the entrance to the apparatus.

In order to achieve this control, I arrange the co-current parallel flow of the cooling medium in such a manner that the rate of flow of the cooling medium $n$ and the temperature of the cooling medium entering the cooling passage of the reactor $\vartheta_1$ can be controlled independently of each other, instantaneously and effectively over the ranges of temperature and flow rate required. By doing so, the perfect balance between the heat of reaction and the heat removal shown by the two symmetrical curves in Fig. 1a can be maintained at any time during the operation of the apparatus. In Fig. 1b there is shown the temperature increase of the cooling medium which occurs in removing the head at the rate of the $$\frac{dq}{dL}$$

function shown in Fig. 1a. It is seen that the temperature of the cooling medium asymptotically approaches the optimum reaction temperature of the reaction in question. The reaction temperature $\vartheta'$ becomes isothermic as also shown in Fig. 1b.

One preferred way of achieving the temperature control described is to recirculate the cooling medium, such as by means of a pump, a blower, or an injector, to pass the cooling medium through an effective cooling device with sufficient capacity for cooling the recycled cooling medium at the highest flow rate to the lowest temperature required, and to provide a bypass of the hot medium which is regulatable instantaneously by a valve or a flap. If air or cooling water is used directly as the cooling medium, no cooling of the recycle stream is necessary, and it is only necessary to provide a recycle line for hot cooling medium in order to regulate the temperature of the cooling medium entering the system with the speed and effectiveness necessary.

A further preferred method of carrying my invention into practice is to provide automatic control to both the temperature and flow regulations of the cooling medium. The control points of this automatic control are:

(A) The region of the maximum temperature in the reagents passage through the reactor in the immediate neighborhood of the entrance of the cooling medium to the cooling passage through the reactor. I provide this point with a suitable temperature control device connected to an instrument of conventional design which automatically regulates the temperature of the cooling medium entering the cooling passage of the reactor.

(B) The exit point of the reacted gas mixture from the catalyst zone is controlled by a similar device connected to an automatic control instrument which regulates the rate of flow of the cooling medium to the cooling passage of the reactor.

I prefer to adjust the regulating instrument controlled by point (A) during the initial stages of the lifetime of a catalyst to maximum temperature, which the catalyst tolerates without deterioration by overheating. The regulating instrument (B) is set to a temperature somewhat above the lower temperature limit necessary for a satisfactory rate of reaction. In special cases, particularly the end of the lifetime of a catalyst charge, I may prefer to set this instrument near the upper allowed limit.

In the later stages of the operating period I may increase or decrease the controlled temperatures of these points and/or I may move the control point (A) farther into the reactor. Which of these measures are best suited in order to achieve the best results depends so much upon the nature of reaction, the type of catalyst used, and the cause of its gradual deterioration, such as whether this is due to poisoning and/or sintering, or other changes of its active surface, that it is impossible to recommend the best measures beforehand. It is best to determine the optimal operating modus within the known limits empirically.

I may also move the point of entry of the cooling medium farther into the reactor during the course of the operating period so as to avoid undesirable excessive cooling of such parts of the catalyst as may become less active.

It is possible to achieve this protection against undue cooling by extending a protecting device, such as an insulating shield, gradually or periodically in between the flow of the cooling medium and such parts of the catalyst that need protection.

It is also possible to provide internal heating inside the catalyst in the portion immediately following the entrance of the reagents in order to safeguard the reaction against "dying" accidentally by too violent cooling. A preferred method for carrying my invention into practice is to provide an entering zone filled with catalyst which is not, or not effectively, cooled. This method is especially useful in such cases where it appears undesirable or impossible to preheat the reagent mixture fully up to the preferred reaction temperature, because of an inherent danger of decomposition.

In the entering zone, the reagents react over the catalysts more slowly than at the usual reaction temperature. The heat of reaction heats up the reaction mixture to the preferred temperature. Cooling should begin immediately at the spot where the proper reaction temperature is reached. It is possible to provide means for regulating the length of the entering zone by movable insulating shields or the like, as was described above.

Another particularly useful method for putting my invention into practice is to use the reaction mixture and/or one or a plurality of constituents thereof as cooling medium.

For example, in carrying out ammonia synthesis, I may pass the mixture of nitrogen and hydrogen, or only nitrogen, under the synthesis pressure through the cooling passage of the reactor in such a way, that the rate of flow and the temperature of the cooling gas are regulated independently from one another and independently from the entrance temperature of the reaction mixture into and its rate of throughput through the catalyst proper.

In the synthesis of phthalic anhydride by oxidation of naphthaline with air, I may prefer to use air directly for cooling the reaction tubes in which the catalyst is placed, or I may place the catalyst in the interspace between the tubes and pass the air through the cooling tubes spaced evenly throughout the catalyst bed. In order to provide a better distribution of the cooling gas and a better heat transfer, I may provide the cooling tubes with center rods held in position by spiders or by spiral fins. These rods increase the gas velocity and the flow resistance, thereby facilitating even distribution of gas between all the tubes and enhancing the heat transfer rate. For the same purpose, I may fill the cooling tubes or the cooling space around the catalyst tubes with a packing. I may prefer to use a packing material with a high heat conductivity, e.g. balls or chips of metal, such as aluminum. The latter method is particularly useful for achieving a high coefficient of heat transfer to the cooling gas in such cases where this appears desirable.

One preferred feature of my invention is to assure the parallel flow of the cooling medium with respect to that of the reaction mixture by providing plates or fins parallel to the direction of the flow in order to prevent interference of heat convection with the direction of the flow.

When applying fixed bed catalysts at high throughput rates, it is customary to let the reaction mixture pass through the catalyst bed in a downward direction in order to prevent undesirable "dancing" of the catalyst, which may be mechanically destroyed thereby. If the cooling medium is passed through the interspace between the catalyst tubes in a downward direction, as is necessary for carrying my invention into practice in this particular case, heat convection might interfere with the direction of the flow, and undesirable eddies may develop. In this case, the application of directional fins or the like becomes a very useful feature of my invention. I may also use for the same purpose a method of packing the interspaces with a solid packing material essentially as described. This packing increases the flow resistance and thereby distributes the flow more evenly over the whole cross-section of the cooling passage.

I may further provide convenient means for preventing gas or vapor lock in the cooling passage when applying a downward flow of a liquid cooling medium. For example, I may build the cooling passage of the reactor according to the principle of communicating vessels. If the flow resistance in the cooling passage demands a high differential pressure, I may provide gas vent valves at the top of the cooling passage. These valves may be automatically operated by floats or the like.

I may further provide means for utilizing the heat of reaction. If this cannot be taken up completely in heating up the entering reagent mixture to the reaction temperature desired, I may provide waste heat boilers, economizers, etc.

Application of my invention is not confined to operation with fixed bed catalysts. I may use it with particular advantage in combination with the so-called "fixed fluidized bed" type, i.e., with little carryover of catalyst in the gas leaving the reactor. In this case the parallel upward flow of the reacting mixture in the reactor and of the cooling medium in the cooling passages is particularly easy to accomplish, since the longitudinal temperature gradient of the cooling medium does not tend to upset the even flow of the cooling medium by undesirable convection.

The application of my invention results in considerable technical and economic advantages, of which the following may be mentioned:

I prefer to make the difference between the reaction temperature and the temperature of the incoming cooling medium ($\vartheta - \vartheta_1$) as great as possible, that is to say, so great that a sufficient amount of heat is removed from the zone of the most violent reaction without, however, undercooling the catalyst. Thus I may in certain cases use temperature differences greater than 100° C. This method allows the application of a rate of flow ($n$) of the cooling medium which is as low as possible, i.e., just enough to exert sufficient cooling at the end of the reaction zone. This saving of cooling medium and/or of pumping energy is a special advantage of my invention.

Another advantage of my invention is that, contrary to common practice, I may use very long reactors. For example, in the production of phthalic anhydride reactors with many thousands of narrow tubes filled with catalysts are used which are at the most about 6 feet long. I prefer to use tube lengths of more than 20 feet, and I may even use tubes which are as long as 50 feet or longer. In these tubes the reaction gas velocity becomes extremely high, so that the heat transport from the catalyst to the tube walls becomes extremely favorable and no local hot spots occur. Therefore, I may choose tubes with a very much greater diameter than those which are commonly used. This fact, coupled with the greater length of the reactor, obviously allows the great advantage of requiring a much smaller number of tubes in a reactor of given capacity, so that the work and the material necessary for constructing the reactor are very considerably reduced.

The invention will be described in further detail with reference to the specific embodiments shown in the drawings. These embodiments are given by way of illustration and not limitation.

In the apparatus shown in Fig. 2, the reaction passage 1 is an extended tube filled with catalyst and surrounded by a cooling jacket. The reaction mixture enters the heat exchanger 3 through the line 2, in which it is heated by heat exchange with the reacted mixture leaving the reaction passage. From the heat exchanger 3 the reaction mixture passes through line 4 to the entrance 5 for the reaction mixture into the reaction tube. The first section 6 of the reaction tube 1 is the entry zone for the reaction mixture, which is adjustable, as will be described later.

The reacted mixture leaves the reaction tube at the point 7 and passes through the line 8 to the heat exchanger 3 and the discharge line 9. The circulation of the cooling agent through the jacket 10 is effected by the pump 11. The discharge line 12 from this pump leads to the valve 13, which regulates the amount of cooling agent entering the cooling jacket 10 at the point 15 through the line 14. The cooling agent leaves the cooling jacket 10 at the point 16 and passes through line 17 to the heat exchanger 18 in which the heat taken up by the cooling agent can be utilized in any convenient manner, for example, the heat exchanger 18 may be a waste heat boiler for generating steam. The spent cooling agent is discharged from the heat exchanger 18 through line 19. It is also possible to recirculate the cooling agent to the system through the line 20, which leads to the suction line 21 of the pump 11.

A by-pass is provided between line 17 mentioned above, and the suction line 21 of pump 11. This by-pass consists of lines 22 and 24, and the regulating valve 23, which regulates the temperature of the cooling agent. In the case described in Fig. 2, the regulating valve 23 is a simple throttle which closes when the temperature becomes too high. The valve 23, therefore, allows a variation of the amount of warm cooling agent admixed to the cool cooling agent which is admitted to the suction side of the pump either through line 21 which supplies fresh cooling agent or through the line 20, through which the cooling agent cooled down in heat exchanger 18 may be recirculated.

The automatic control of the regulating valve 23 is achieved by a thermo-regulating device 25, which is arranged immediately after the entry zone 6 which can be adjusted by the sliding jacket 26, which insulates a portion of the reaction passage from the cooling jacket. The sliding jacket may consist of heat insulating material and/or may be provided with a heating coil in order to compensate for heat losses. The thermo-regulating device 25 also slides in order to be adjustable to the correct position relative to the end of the entry zone 6. The regulating impulse from the thermo-regulator 25 is transferred over the line 28 to a relay 29, which operates the valve 23 via the connection 30. By this arrangement the proportion of warm and cooled cooling agent in the mixture entering the cooling agent pump 11 is regulated according to the temperature measured at the location of the thermo-regulator 25.

A similar thermo-regulating device 27 is arranged at the exit end of the reaction passage. The regulating impulses are transferred over the line 31 to the relay 32, which, via the connection 33 operates the valve 13. This valve regulates the flow rate of the cooling agent to the reactor automatically according to the temperature measured at the exit end of the reactor. The regulating valve 13 opens when the temperature at the location of the thermo-regulator 27 becomes too high and it closes if the temperature becomes too low, thus increasing or decreasing the flow rate of the cooling agent.

The thermo-regulating devices may be of any known or conventional construction and merely comprise thermostatic control devices. When it is stated herein and in the claims that the thermo-regulating devices are arranged at certain positions in the reaction passages, as, for example, at the entrance and exit ends of the passages, it is, of course, understood that there is meant thereby that the temperature-sensitive portion of the thermo-regulating device is arranged at the position indicated.

The apparatus for carrying out exothermic reactions, which is shown in Fig. 3, is of another type, in which a plurality of cooling passages 10a are inserted into a comparatively large reaction passage 1a filled with catalyst. The conditions for heat transfer from every point of the reaction passage to the nearest cooling tube are therefore essentially the same as if the reaction passage were divided into the same number of single passages corresponding to the number of interspaces between the cooling passages. The flow of the reaction mixture proper is in this example only indicated symbolically by the entrance 5a and the exit 7a. (The plant may, however, comprise heat exchangers for preheating the reaction mixture and for utilizing the heat of the reacted mixture. In simple cases, one heat exchanger may suffice for heating the reaction mixture by counter current with the reacted mixture in the same manner as shown in Fig. 2, in which the heat exchanger 3 is provided for this purpose.)

In this example the cooling agent is completely circulated by the pump 11a placed near the exit 16a from the lower cooling agent header. The pump 11a pumps the cooling agent through the line 17a to the heat exchanger 18a, where it is cooled by a secondary cooling medium, such as air or cooling water. This secondary cooling medium is supplied through line 34 and its flow rate is regulated by the regulating valve 23a. It flows through line 35 to the shell of the heat exchanger 18a and is discharged through line 36. The valve 23a, which varies the flow rate of the secondary cooling medium, thus regulates the temperature of the circulating cooling agent. The latter, cooled down to the temperature desired, leaves the heat exchanger 18a through line 12a. The flow rate of the circulating cooling agent is regulated by the regulating valve 13a, which allows the cooling medium to flow through line 14a at the rate desired to the sliding header 38, which distributes it to the insulated tubes 39 in the header. The thermo-regulating device 25a has a smaller outer diameter than the inner diameter of the conduit through which it extends thus allowing the cooling medium to flow through line 14a to the sliding header 38, the cooling agent entering through entrances 15a. From these tubes, the cooling agent passes to the cooling agent entrances 15a for the cooling agent passages 10a. These passages are provided with displacer rods 37 in order to increase the linear velocity of the cooling agent and to prevent convection currents.

The automatic regulation for the valves 23a and 13a is based on the same principle as shown in Fig. 2. The sliding well 26a contains at its lower end the thermo-regulating device 25a arranged near the entrance of the reagents to the reaction chamber. The thermo-regulating device 25a is situated after the entry zone 6a. In Fig. 3 this entry zone is practically non-existent, because the header 38 is shown drawn up into its highest position. This header bears the insulated tubes 39, the thermo-regulating device 25a, the cooling agent entrances 15a, and the rods 37. If and when a longer entry zone becomes desirable, the header is lowered, so that the elements 39, 15a and 37 protrude farther into the cooling passages 10a. In this manner that part of the reaction passages, which is protected from being cooled down by the cooling agent, can be considerably extended during the operation period which is given by the lifetime of the catalyst. This extension allows protection from undue cooling of that zone of the catalyst layer which in most cases gradually becomes inactive by poisoning or the like. The thermo-regulating device 25a acts through the line 28a upon the relay 29a, which, in turn, operates the regulating valve 23a by means of the connection 30a. In this manner the temperature of the cooling agent is regulated by the thermo-regulating device 25a and serves to control the temperature in the zone of the highest conversion where the thermo-regulating device 25a is located. The thermo-regulating device 27a, located near the exit of the reacted mixture from the reaction passage, acts through the line 31a upon the relay 32a, which, in turn, operates the regulating valve 13a by means of the connection 33a. In this manner the flow rate of the cooling agent is regulated by the thermo-regulating device 27a, and this flow rate serves to control the catalyst temperature at the exit end of the reaction passage.

The application of my invention does not preclude the application of other known methods and/or devices for facilitating the control of the reaction temperature. Thus, I may recycle part of the reacted gases to the reactor, thereby diluting the reagents, or I may use inert gases or vapors for diluting the reagents, or I may use other means for reducing the intensity of heat development in the reaction zone, together with and independently of the application of my invention described above.

I claim:

1. In the method for effecting exothermic catalytic reactions, in which a fluid reactant is passed through a reaction zone in contact with a catalyst at a predetermined reaction temperature, the improvement for the temperature control of the reaction, which comprises passing a fluid cooling agent in parallel co-current flow to and in indirect heat exchange contact with the fluid reactant passing through the reaction zone, independently varying the temperature of the cooling agent entering in heat exchange contact with the reactant inversely with the reaction temperature at the beginning of the reaction zone and the rate of flow of the cooling agent directly with the temperature at the exit of the reactant from the reaction zone, to thereby maintain the predetermined reaction temperature over the length of the reaction zone.

2. Improvement according to claim 1, in which the fluid reactant is passed through an entry path of flow in the reaction zone prior to said heat exchange contact, and in which the temperature of the cooling agent entering in heat exchange contact with the reactant, is varied inversely with the reaction temperature at substantially the initial point of heat exchange contact with the cooling agent.

3. Improvement according to claim 1, in which the temperature of the cooling agent entering into heat exchange contact with the reactant and the rate of flow of the cooling agent are independently varied to maintain a maximum initial temperature differential between the cooling agent and reactant.

4. Improvement according to claim 1, in which a portion of the cooling agent, after passage in heat exchange contact with the reactant, is directly recycled to the cooling agent being passed in heat exchange contact, and in which the temperature of the cooling agent is varied by varying the amount of cooling agent recycled.

5. Improvement according to claim 4, in which the remaining portion of the cooling agent after the heat exchange contact is cooled and recycled to the heat exchange contact.

6. Improvement according to claim 1, in which the cooling agent after heat exchange contact with the reactant is cooled and recycled, and in which the temperature of the cooling agent entering into heat-exchange contact is varied by controlling the degree of cooling of the cooling agent being recycled.

7. In an apparatus for effecting exothermic catalytic reactions having an elongated reaction chamber defining a passage for fluid reactants therethrough, the improvement for temperature control, which comprises means defining a passage for cooling agent in heat exchange contact and substantially parallel to the passage for reactants through the reaction chamber, first thermo-regulating means positioned in the reaction chamber, second thermo-regulating means positioned in the reaction chamber, means for passing cooling agent to and through the cooling agent passage in the same flow direction as the flow direction for reactants through the reaction chamber, means for adjusting the temperature of the cooling agent passed to the cooling agent passage controlled by said first thermo-regulating means, and means for adjusting the flow rate of the cooling agent passed through the cooling agent passage controlled by said second thermo-regulating means.

8. Improvement according to claim 7, in which said first thermo-regulating means is positioned at the beginning of the path of flow of the reactants through the reaction chamber.

9. Improvement according to claim 8, in which said second thermo-regulating means is positioned at the end of the path of flow of the reactants through the reaction chamber.

10. Improvement according to claim 7, including means for insulating the initial portion of the passage of fluid reactants through the reaction chamber from heat exchange contact with said passage for cooling agent.

11. Improvement according to claim 10, in which said last-mentioned means are adjustable to thereby adjust the length of the initial portion of the passage of fluid reactants through the reaction chamber insulated from heat-exchange contact with the passage for cooling agent.

12. Improvement according to claim 11, in which said first thermo-regulating means is positioned at substantially the initial point of heat exchange contact between the passage for reactants and passage for cooling agent, and in which said first thermo-regulating means is adjustable with the insulating means.

13. Improvement according to claim 7, in which said means for adjusting the temperature of the cooling agent passed to the cooling agent passage comprises adjustable valve means controlled by said first thermo-regulating means and means for recycling a portion of cooling agent after passage through the cooling agent passage through said variable valve means and back to the cooling agent passage.

14. Improvement according to claim 7, in which said means for passing cooling agent to and through the cooling agent passage includes a heat exchanger and means for recycling cooling agent from the cooling agent passage through the heat exchanger back to the cooling agent passage, and which said means for adjusting the temperature of the cooling agent passed to the cooling agent passage includes variable valve means controlled by said first thermo-regulating means, and means for passing a second cooling agent through said adjustable valve means through said heat exchanger for indirect heat exchange contact with the first-mentioned cooling agent.

References Cited in the file of this patent

UNITED STATES PATENTS

| | | |
|---|---|---|
| 1,599,228 | Gibbs | Sept. 7, 1926 |
| 1,624,294 | Wallace et al. | Apr. 12, 1927 |
| 1,685,759 | Walter | Sept. 25, 1928 |
| 2,185,929 | Simpson et al. | Jan. 2, 1940 |
| 2,320,273 | Gohr | May 25, 1943 |
| 2,409,376 | Mekler | Oct. 15, 1946 |
| 2,670,272 | Nutting | Feb. 23, 1954 |
| 2,788,264 | Bremer et al. | Apr. 7, 1957 |